Feb. 20, 1962  J. HENCHERT  3,021,805
METHOD OF MAKING A TEAR STRIP CAN BODY
Filed Jan. 14, 1960  4 Sheets-Sheet 1

INVENTOR
John Henchert.
BY
Mason, Porter, Diller & Stewart
ATTORNEYS

Feb. 20, 1962 J. HENCHERT 3,021,805
METHOD OF MAKING A TEAR STRIP CAN BODY
Filed Jan. 14, 1960 4 Sheets-Sheet 2

INVENTOR
John Henchert.

BY
Mason, Porter, Diller & Stewart
ATTORNEYS

United States Patent Office 3,021,805
Patented Feb. 20, 1962

3,021,805
METHOD OF MAKING A TEAR STRIP CAN BODY
John Henchert, River Forest, Ill., assignor to Continental Can Company, Inc., New York, N.Y., a corporation of New York
Filed Jan. 14, 1960, Ser. No. 2,445
3 Claims. (Cl. 113—120)

The invention relates generally to metallic receptacles, and more particularly to collar cans wherein are provided tear strips adapted to be wound on keys and by this means torn out of the body walls of the cans in order to effect an opening of the cans, and it primarily seeks to provide a novel method of forming the novel tear strip structure covered in my parent application, Serial No. 520,195, filed July 6, 1955, now Patent No. 2,860,812, and entitled Collar Can and Method of Making Same, of which my application, Serial No. 608,493, filed September 7, 1956, now abandoned, constitutes a division, and this application is a continuation-in-part of my application Serial No. 608,493.

In cans of the character stated the tear strips are defined by parallel score lines which surround the cans adjacent the upper end closures thereof, and a collar is mounted in the upper end of each can opposite its tear strip in position for extending upwardly from the upper extremity of the can body resulting from the tearing out of the tear strip, thereby to maintain the desired can body wall height and provide a support neck over which the skirt or body wall portion remaining attached to the upper end closure can be telescoped to effect a reclosure of the can.

Much difficulty has been experienced in the opening of conventional forms of collar cans because the conventional tear strips are springy, smooth and flat, and in the course of the winding of a tear strip about a key the winding strip tends to side slip or wind off line. This problem is aggravated by the springy nature of the tear strips and the tendency of the tear strips to partially spring out or unwind each time the key is released by a person opening a can preparatory to obtaining a new grip on the key after each partial winding of the strip. It is a purpose of the present invention to provide a novel rib and groove arrangement on each tear strip subject to nesting as the strip is being wound about a key and in a manner assuring against side slipping and off line winding of the strip.

Single and even double ribbed tear strips have been known heretofore, but in these known structures the ribbing has been projected wholly outward or wholly inward with relation to the plane or cross section of the can body wall, and these arrangements have proven disadvantageous for a number of reasons. One disadvantage has been the necessity of projecting the ribs too far outwardly or inwardly of the can body wall plane or cross section in order to provide a practical depth of ribbing. When it has been sought to provide projection of the ribbing wholly inward of the can body wall the inward projections presented problems incidental to the mounting of the can collars. When it is sought to provide projection of the ribbing wholly outward of the can body wall the depth of the ribbing must be curtailed in order to avoid provision of unsightly and impractical outward projections. Also, outward ribbing alone, single or double, has been found somewhat objectionable in that it tends to provide such localized rigidity in the ribbing and leverage during the tearing out of a given strip that there is a resulting tendency to turn outwardly, the raw metal edge at the remaining can body top extremity, and this outwardly turned edge is positioned for damaging contact by a user of the can. An object of the present invention is to provide a novel method of forming a collar can structure wherein is included a tear strip embodying multiple ribbing placed in a novel manner effective to avoid the disadvantages hereinabove enumerated.

It has also been noted that in known practices of scoring the can body blanks to define the tear strips therein the rolling contact of the scoring rolls serves to distort and wave the edge of the body blank adjacent and paralleling the score lines, making it necessary to pass the blanks through flat surfaced, wave flattening rolls in order to remove the objectionable marginal waves created during the scoring of the blanks. According to another feature of the present invention the formation of the tear strip ribbing is accomplished by rolling contact through the medium of ribbing and flattening roll action subsequent to the scoring action and simultaneously serving to form the ribbing and remove from the blanks all marginal waving created incidental to said scoring action. It has also been found that this manner of forming the tear strip ribbing simultaneously with the rolling out or flattening of the wavy marginal portions created by the scoring action provides a flexing roll-like function in breaking the grain in the tear strip and removing therefrom substantially all tendency to spring outwardly about the key when gripping of the key is released by a person opening the can, as aforesaid.

Another object of the invention is to provide a novel method of producing a can of the character stated including a tear strip having therein at least three ribs, one projecting in one direction beyond the plane or cross section of the can body wall, and the other two projecting in the opposite direction beyond said wall, thus making it possible to provide a deeper rib arrangement than at the other rib locations and without objectionable projection of any of the ribs at either side of the wall plane or cross section.

A further object of the invention is to provide novel method of producing a novel tear strip rib placement of the character stated wherein the center rib is projected inwardly of the body wall approximately .007 of an inch and the rib to each side of the center rib .007 of an inch, thereby providing with this limited and yet entirely satisfactory rib projection a center rib approximately .014 of an inch in depth, much greater than could otherwise be provided without objectionable projection of ribbing beyond either side of the body wall plane or cross section.

A still further object of the invention is to provide a novel method of forming collar can bodies including the steps of moving the body blanks through scoring rolls to provide the tear strip defining scores, and then through tear strip ribbing and flattening rolls effective simultaneously to form ribs in parallel relation along the score line defined tear strips and flatten out wavy marginal portions of the blanks created incidental to the scoring action.

With the above and other objects in view that will hereinafter appear, the nature of the invention will be more clearly understood by reference to the following detailed description, the appended claims and the several views illustrated in the accompanying drawings.

Figure 7:
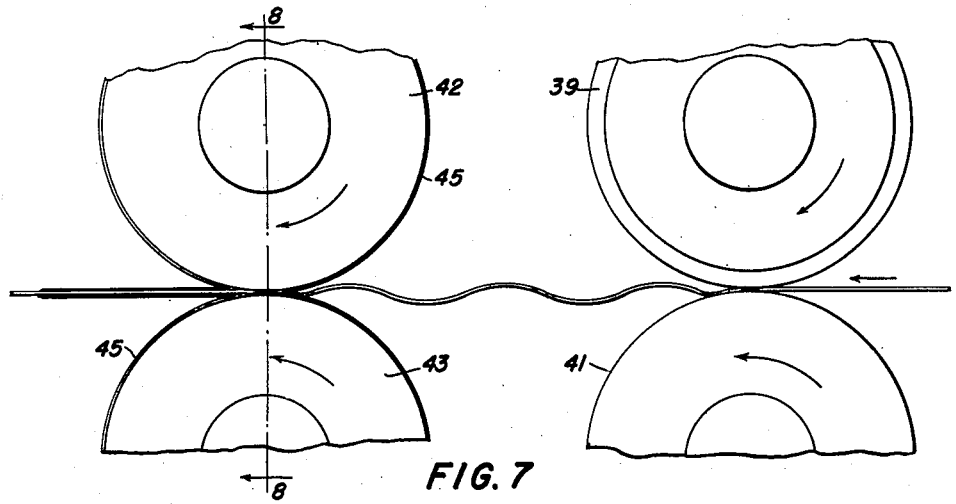

FIGURE 7 is an enlarged fragmentary side view showing portions of the scoring rolls and the embossing and blank margin flattening rolls, a blank being shown between the cooperating roll sets and having the tear strip area thereof defined by the scoring rolls and ribbed or embossed by the embossing and flattening rolls and having the wave created incidental to the scoring action removed by the flattening portion of said embossing and flattening rolls.

Figure 8:
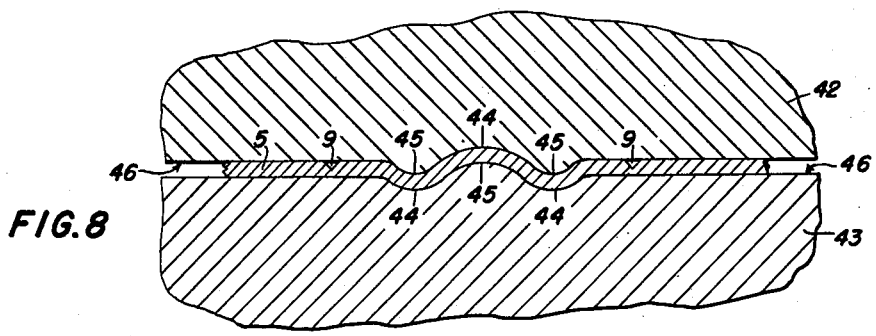

FIGURE 8 is a fragmentary sectional view taken on the line 8—8 of FIGURE 7 and showing the embossing and flattening rolls engaging and reshaping a blank passing therebetween.

Figure 9:
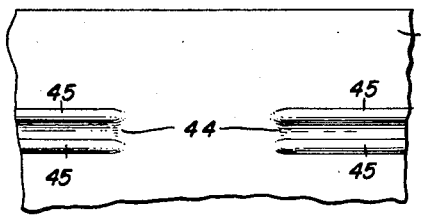
Figure 10:
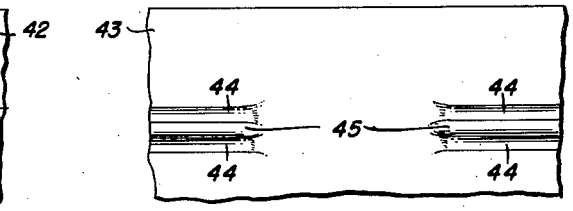

FIGURES 9 and 10 are partial developments of the cooperating embossing and flattening rolls showing how the cooperative ribbing and grooving in the rolls terminate so as to avoid embossing of the tear strip area adjacent the seam margins of the blanks and the tongue extension thereof.

Figure 4:
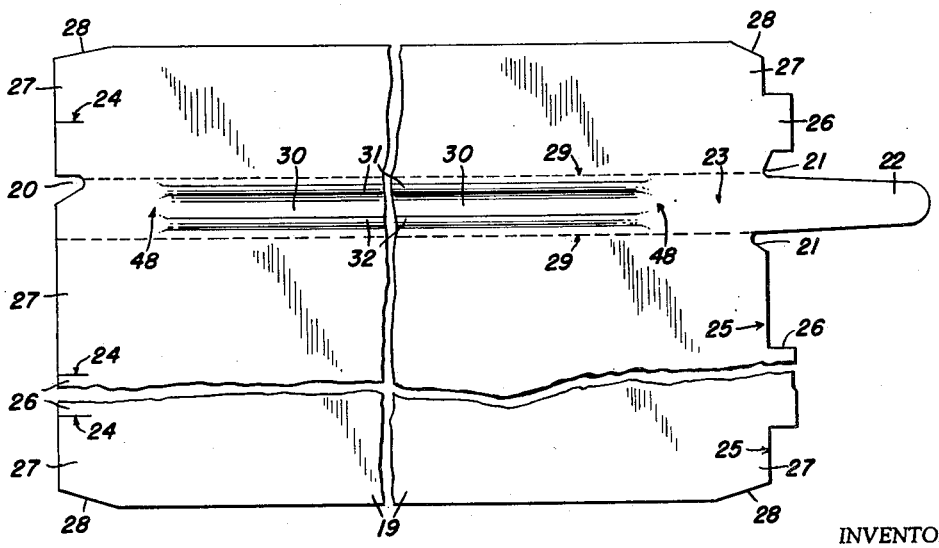
FIGURE 4 is an enlarged face view of a formed body blank formed in accordance with the invention, parts intermediately of the ends and the top and bottom of the blank being broken away.
Figure 5:
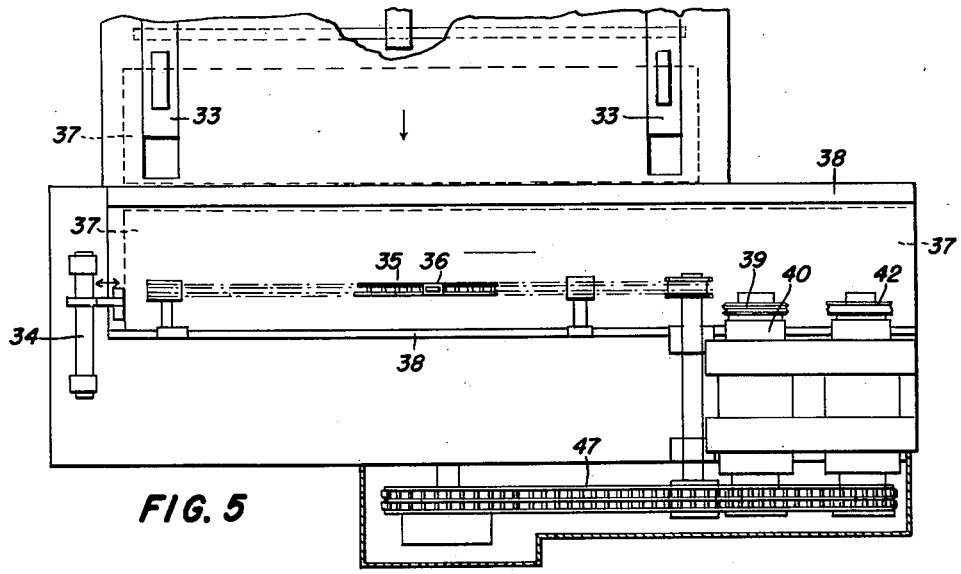
FIGURE 5 is a somewhat diagrammatic plan view illustrating the blank scoring rolls and the rib embossing and blank margin flattening rolls, the devices for feeding the blanks to said rolls also being shown.
Figure 6:
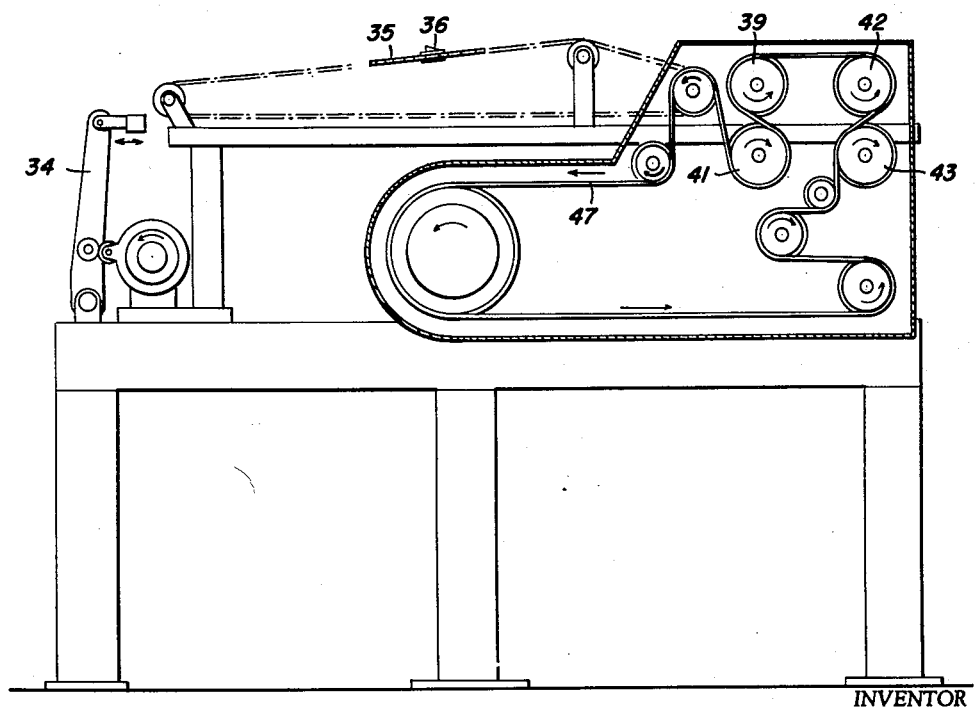
FIGURE 6 is a somewhat diagrammatic side elevation showing the parts illustrated in FIGURE 5.
Figure 11:
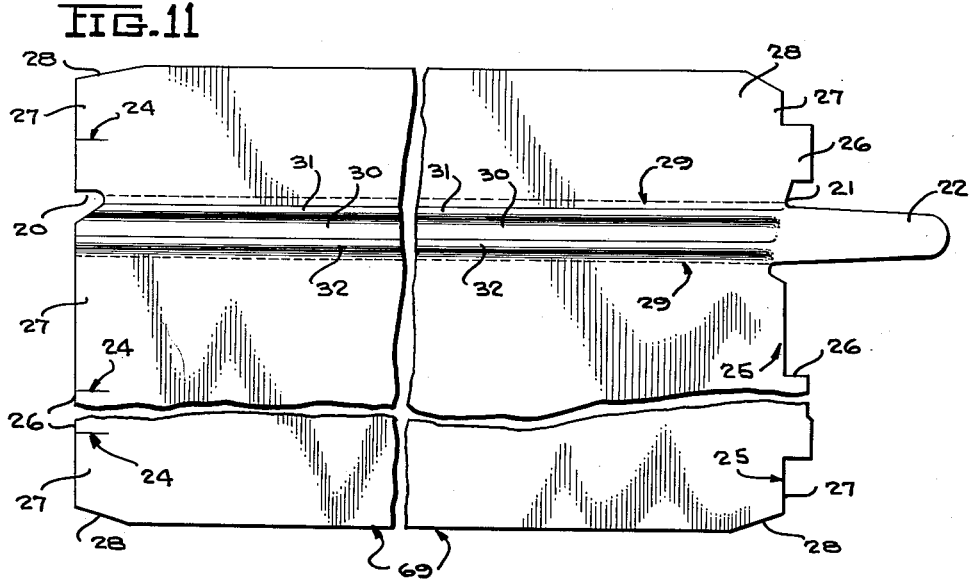

FIGURE 11 is an enlarged face view of a formed body blank, the view being similar to FIGURE 4 and showing the ribbing as extending from one edge of the body blank and terminating at the other edge thereof at the start of the tab of the tear strip.

Figure 12:
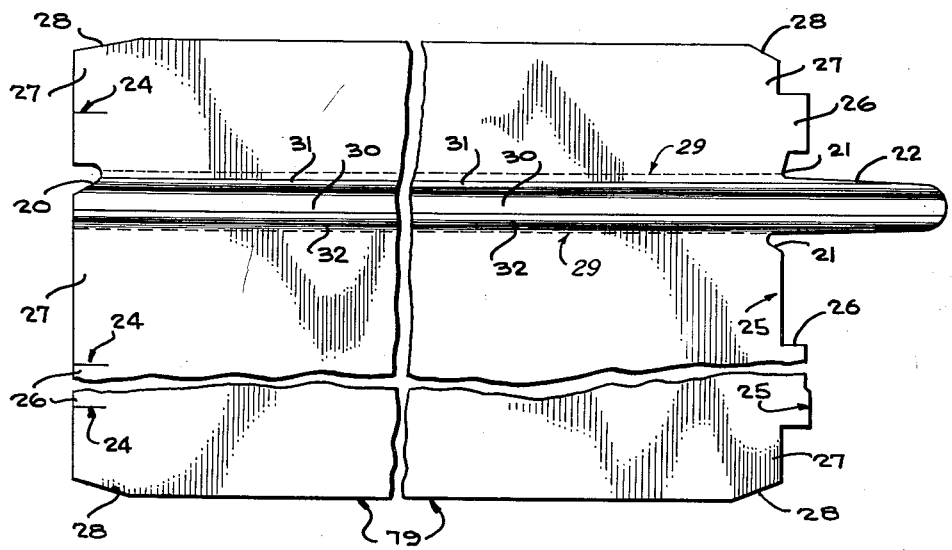

FIGURE 12 is an enlarged face view of a formed body blank, the view being similar to FIGURE 4 and showing the ribbing as extending the full length of the tear strip including the tab thereof.

In the example disclosure of the invention herein illustrated, the improved collar can structure includes a body generally designated 5, a bottom end closure 6 and a top end closure 7, said closures being secured in place on the flanged can body by the usual double rolled seam structures as at 8.

Figure 1:
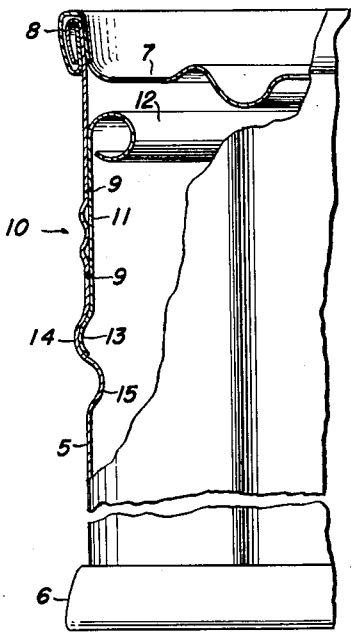
FIGURE 1 is a side elevation illustrating a collar can produced by practicing the invention, a portion of one side of the can adjacent the top thereof being broken away to show the positioning of the collar and tear strip.
Figure 3:
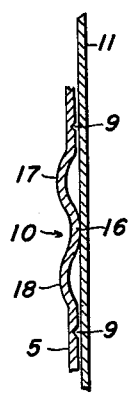
FIGURE 3 is an enlarged fragmentary vertical cross section showing the specific ribbing arrangement on the tear strip.
Figure 2:
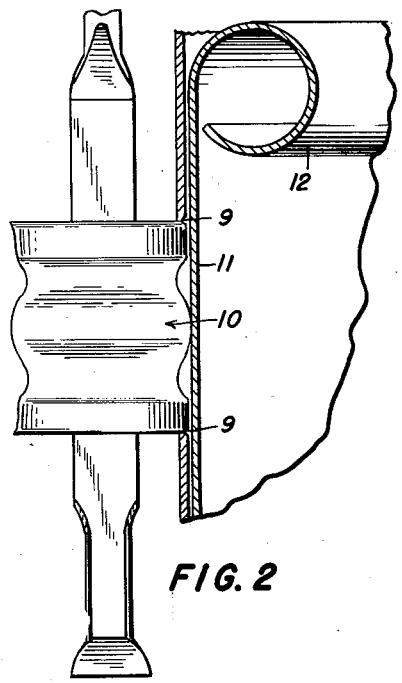
FIGURE 2 is an enlarged fragmentary sectional view showing the tear strip in the process of being torn out, the same being partially wound onto a key.

Score lines 9 define a tear strip 10 near the upper end of the can body, and opposite this tear strip a collar 11 is mounted in the body in the manner clearly illustrated in FIGURES 1 and 3, said collar having an inwardly directed curl 12 at its upper end, and its lower end anchored as at 13 in the outwardly directed body bead 14 immediately above the inwardly directed body bead 15. It is to be understood that the collar mounting beading 14, 15 may be formed after insertion of the collar into the formed can body.

According to the invention, the tear strip 10 is equipped with an inwardly projecting center rib 16, an upper outwardly projecting rib 17 above the center rib, and a lower outwardly projecting rib 18 below the center rib. In this particular illustration, each of the ribs 16, 17 and 18 is projected inwardly or outwardly approximately .007 of an inch beyond the plane or cross section of the body wall 5. It will be clearly apparent by reference to FIGURE 3 of the drawings that this particular placement and dimensioning of the tear strip ribbing provides a center rib 16 of approximately .014 of an inch, thus providing the desired depth of ribs and grooves without projecting any rib an impractical distance inwardly or outwardly beyond the body wall plane or cross section so that it would comprise an unsightly projection or one which would interfere with practical mounting of the collar within the upper portion of the can body.

The can body 5 shown in the previously described illustrations, preferably but not necessarily, is made up from a blank 19 as illustrated in FIGURE 4. Such blanks may first be fed with a long edge forward, or in a direction perpendicular to the length of the blank, through suitable apparatus for notching the blank at 20 at one and at 21 at its other end in the tear strip area, and providing the tongue extension 22 on the tear strip area 23 defined by the score lines. During such feeding of the blanks they are also slit at 24 at one and notched at 25 at the other end to provide the hook margins 26 and lap areas 27, and also may be angle cut at 28 at their corners. This having been accomplished the blanks are then fed in the direction of their length through scoring rolls to form parallel scores 29 defining the tear strip and thence through embossing and flattening rolls which simultaneously flatten the wave provided in the blank margin adjacent the tear strip area and provide the inwardly projected center rib 30 and the upper and lower oppositely projected ribs 31 and 32 along the tear strip area 23 defined between the score lines 29.

Portions only of the apparatus for feeding and shaping the blanks are shown diagrammatically herein, reciprocating feed means for feeding the blanks in a direction perpendicular to their length being indicated at 33, reciprocating feed means for feeding the blanks in the direction of their length are indicated at 34 and are effective to present the blanks to the feeder chains 35 having thereon suitably spaced feed dogs 36 which feed the blanks over supporting table means 37 and between gaging devices 38 to the roll sets.

The blanks being fed by the chains 35 first pass between the upper scoring roll 39 rotatably supported at 40 and the lower plain surfaced opposing roll 41, and then said blanks pass between the upper and lower ribbing rolls 42 and 43 which include in addition to the grooving at 44 and ribbing at 45, plain straightening surfaces 46 which are effective in the manner previously described for removing the wave created at the marginal portion of the blanks beside the tear strip area. Roll driving devices are diagrammatically illustrated and generally designated 47, and it is to be understood that the driving devices are so coordinated that the ribbing and grooving on the cooperating upper and lower rolls 42 and 43 will be placed so as to terminate the ribbing on the tear strip at 48, short of the position of the tongue extension 22 and the seam area at each end of the blank, as will be clearly apparent by reference to FIGURES 4, 9 and 10.

A modified form of blank is illustrated in FIGURE 11 and referred to generally by the numeral 69. The blank 69 differs from the blank 19 only in that in lieu of terminating the ribs 30, 31, 32 short of the edges of the blank, in the blank 69 the ribs 30, 31, 32 extend from the left edge of the blank to the right edge of the blank, exclusive of the tongue extension 22, the tongue extension 22 remaining flat.

Another form of blank is illustrated in FIGURE 12, the blank being generally referred to by the numeral 79. The blank 79 is also essentially the same as the blank 19, the blank 79 differing from the blank 19 in the extent of the ribs 30, 31, 32. Like ribs of blank 69, the ribs 30, 31, 32 of the blank 79 start at the left edge of the blank. However, in the blank 79 the ribs 30, 31, 32 do not terminate at the right edge of the blank, but continue onto the tongue extension 22. In the formation of the ribs 30, 31, 32 on the blank 79, it is not necessary that the upper and lower ribbing rolls 42 and 43 have flat areas as are required in the function of the ribs of the blanks 19 and 69.

It will be apparent from the foregoing that the tear strip formed by use of the apparatus disclosed herein and by practicing the method disclosed herein includes three ribs, one projecting in one direction beyond the plane or cross section of the can body wall, and the other two projecting in the opposite direction beyond said wall, thus making it possible to provide a deeper rib and groove centrally of the three-rib arrangement than at the other rib locations, without objectionable projection of any of the ribs at either side of the wall plane or cross section. It will be noted by reference to FIGURE 3 that the inward projection of the rib 16 provides an outwardly opening groove between the crests or high points of the upper and lower ribs 16, 17 which is approximately twice the depth, or in other words the degree of projection of any one of the tear strip ribs 16, 17 and 18.

The particular method of passing the blanks first through the scoring rolls and then through the rolls which simultaneously emboss the rib arrangement in the score line defined tear strip and straighten out the marginal wave in the blank created incidental to the scoring action is novel and provides marked advantages. This particular manner of providing the rib arrangement in the tear strip provides a flexing roll-like function in breaking the grain in the tear strip and removing therefrom substantially all tendency to spring outwardly about the key when gripping of the key is released by a person opening the can. It is possible in the use of the disclosed tear strip arrangement to apply a key to the tongue 22 and wind the strip thereon with the strip ribs and grooves accurately and firmly nested in a manner securing the winding strip against side slip and off-winding.

While example disclosures of the structure and method steps are made herein, it is to be understod that the disclosed structure and practices may be varied without departing from the spirit and scope of the invention as defined in the appended claims.

I claim:

1. The method of preparing a body blank for a tear strip can comprising the steps of feeding the blank in the direction of its length through scoring roll means to define a tear strip paralleling one long margin of the blank, and feeding the scored blank through embossing and flattening roll means to simultaneously flatten out waves created in said margin incidental to the scoring action and to form at least three parallel spaced ribs along the tear strip with an intermediate rib projecting in one direction beyond the plane of the blank and the two immediately adjacent ribs projecting in the opposite direction beyond the plane of the blank, thereby providing a flexing roll-like function in breaking the grain in the tear strip and removing therefrom substantially all tendency to spring outwardly from around a key when wound upon the key and released.

2. The method of preparing a body blank for a tear strip can comprising the steps of feeding the blank in the direction of its length through scoring roll means to define a tear strip paralleling one long margin of the blank, and while the blank is still being gripped by the scoring roll means, starting the blank into and then passing the same through embossing and flattening roll means to simultaneously flatten out waves created in said margin incidental to the scoring action and to form three parallel spaced ribs along the tear strip with an intermediate rib projecting in one direction beyond the plane of the blank and the two immediately adjacent ribs projecting in the opposite direction beyond the plane of the blank with the ribs merging in smooth cross sectional curves forming a regular and continuous undulation, thereby providing a flexing roll-like function in breaking the grain in the tear strip and removing therefrom substantially all tendency to spring outwardly from around a key when wound upon the key and released.

3. The method of preparing a body blank for a tear strip can comprising the steps of feeding the blank in the direction of its length through scoring roll means to define a tear strip paralleling one long margin of the blank, feeding the scored blank through embossing and flattening roll means to simultaneously flatten out waves created in said margin incidental to the scoring action and to form three parallel spaced ribs along the tear strip with an intermediate rib projecting in one direction beyond the plane of the blank and the two immediately adjacent ribs projecting in the opposite direction beyond the plane of the blank with the ribs merging in smooth cross sectional curves forming a regular and continuous undulation and with each rib projecting a like distance in one direction or the other beyond the plane of the blank, thereby to cause the intermediately projected rib to provide a centrally presented groove extending between the crests of the two ribs immediately adjacent which is substantially twice the depth of projection of any individual rib beyond the plane of the blank, and coordinating the feeding of the blanks and the placement of the embossing means on the embossing and flattening rolls so as to terminate the rib formation in each tear strip short of each end thereof.

References Cited in the file of this patent

UNITED STATES PATENTS

| | | |
|---|---|---|
| 1,879,873 | Hopkins | Sept. 27, 1932 |
| 2,333,841 | Bugge | Nov. 9, 1943 |
| 2,361,401 | Hothersall | Oct. 31, 1944 |
| 2,495,294 | Socke | Jan. 24, 1950 |